(12) United States Patent
Wang et al.

(10) Patent No.: US 11,132,387 B2
(45) Date of Patent: Sep. 28, 2021

(54) EVENT DISPLAY METHOD AND DEVICE (71) Applicant: Beijing Baidu Netcom Science and Technology Co., Ltd., Beijing (CN)

(72) Inventors: Jing Wang, Beijing (CN); Haiyan Mo, Beijing (CN); Youwen Yu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 326 days.

(21) Appl. No.: 16/255,359

(22) Filed: Jan. 23, 2019

(65) Prior Publication Data

US 2020/0004761 A1 Jan. 2, 2020

(30) Foreign Application Priority Data

Jun. 28, 2018 (CN) .......................... 201810688337.4

(51) Int. Cl.
*G06F 16/28* (2019.01)
*G06F 16/2457* (2019.01)

(52) U.S. Cl.
CPC ...... *G06F 16/287* (2019.01); *G06F 16/24578* (2019.01)

(58) Field of Classification Search
CPC ................. G06F 16/248; G06F 16/285; G06F 16/24578; G06F 16/287; G06F 16/951
USPC ....................................................... 707/725
See application file for complete search history.

(56) References Cited

U.S. PATENT DOCUMENTS

| 9,928,622 B2 | 3/2018 | Higgins et al. |
| 2005/0012743 A1* | 1/2005 | Kapler .................. G06F 16/447 345/419 |
| 2009/0100107 A1* | 4/2009 | Benner, Jr. ............. G06Q 10/00 |
| 2010/0185984 A1* | 7/2010 | Wright .................... G06F 16/29 715/833 |
| 2011/0032260 A1* | 2/2011 | Duggan ............. H04L 41/0604 345/440 |

(Continued)

FOREIGN PATENT DOCUMENTS

| CN | 106095659 A | 11/2016 |
| CN | 107784477 A | 3/2018 |

(Continued)

OTHER PUBLICATIONS

Chinese Search Report, Application No. 201810688337.4, dated May 28, 2019, 4 pages.

(Continued)

*Primary Examiner* — James Trujillo
*Assistant Examiner* — Fariborz Khoshnoodi
(74) *Attorney, Agent, or Firm* — Patterson Thuente Pedersen, P.A.

(57) ABSTRACT

An event display method and an event display device are provided. The method includes: acquiring types of events; setting colors for the events based on the types of the events; grouping the events based on starting times and ending times of the respective events; and displaying the events based on the grouping and colors of the events. According to the embodiments, the event type, event distribution and event duration can be intuitively displayed, the user can quickly screen out valid events and quickly acquire valid information of the events, thereby quickly positioning a fault and determining a cause for the fault.

10 Claims, 8 Drawing Sheets

(56) References Cited

U.S. PATENT DOCUMENTS

| | | | | |
|---|---|---|---|---|
| 2015/0026724 A1* | 1/2015 | Alder | ............... | H04N 21/4312 |
| | | | | 725/40 |
| 2015/0178690 A1* | 6/2015 | May | ............... | G06Q 10/1095 |
| | | | | 705/7.19 |
| 2017/0053008 A1* | 2/2017 | Frenkel | ............... | G06F 16/26 |
| 2017/0083585 A1* | 3/2017 | Chen | ............... | G06F 11/323 |
| 2019/0294734 A1* | 9/2019 | Beringer | ............... | G06F 16/903 |

FOREIGN PATENT DOCUMENTS

| | | |
|---|---|---|
| CN | 107809531 A | 3/2018 |
| CN | 107851275 A | 3/2018 |
| CN | 108021397 A | 5/2018 |
| CN | 108170830 A | 6/2018 |
| EP | 0542662 A1 | 5/1993 |
| WO | WO 2012/164434 A1 | 12/2012 |

OTHER PUBLICATIONS

Chinese Office Action, Application No. 201810688337.4, dated Jun. 5, 2019, 17 pages.
CN First Office Action for CN Patent Application No. 201810688337.4, dated Apr. 10, 2019, 13 pages (with English translation).
CN Search Report for CN Patent Application No. 201810688337.4, dated Apr. 3, 2019, 4 pages (with English translation).

* cited by examiner

EVENT DISPLAY METHOD AND DEVICE

CROSS-REFERENCE TO RELATED APPLICATION

This application claims priority to Chinese Patent Application No. 201810688337.4, filed on Jun. 28, 2018, which is hereby incorporated by reference in its entirety.

TECHNICAL FIELD

The present disclosure relates to the technical field of data storage, and in particular to an event display method and device.

BACKGROUND

For the event screening method and fault positioning method, there are two visualized schemes more frequently used: trend graph and table, wherein in the trend graph, data are authenticated based on data trend in combination with manual analysis, thereby positioning an abnormal time interval, and in the data table, time and detailed information of an abnormal event are positioned and displayed by artificially-involved numerical analysis.

The number of events occurring at a certain time point may be observed from the trend graph, but a distribution of events and a duration of each event cannot be intuitively displayed to a user. If the user wants to further know the type, distribution and duration of the event, the user needs to view data tables and perform manual analysis.

SUMMARY

An event display method and device is provided according to embodiments of the disclosure, to at least address one or more technical problems in the related art. In a first aspect, an event display method is provided according to an embodiment of the disclosure, which includes data representing a plurality of events, each event having a starting time and an ending time. setting colors for the events based on the types of the events; grouping the events based on starting times and ending times of the respective events, and displaying the events based on the grouping and colors of the events.

In embodiments, the grouping the events based on starting times and ending times of the respective events includes: ranking events to be grouped in a chronological order based on the starting times of the events, to obtain a ranked order of events, adding the first event of the ranked order into a first group, for each additional event in the ranked order of events, comparing starting times of other events in the ranked order with an ending time of the first group sequentially, wherein the ending time of the first group is an ending time of the last event added into the first group, and when the starting time of one of other events in the ranked order is later than the ending time of the first group, adding the one of other events into the first group, and when the starting time of one of other events in the ranked order is earlier than the ending time of the first group, adding the one of other events into a second group.

In embodiments, the grouping the events based on starting times and ending times of the respective events includes adding events of the same type into a group; and further grouping the events of the group based on starting times and ending times of the respective events of the group.

In embodiments, further grouping the events of the group based on starting times and ending times of the respective events of the group includes ranking the events of the group in a chronological order based on starting times of the events of the group, to obtain a ranked order, reserving the first event of the ranked order in the group; comparing starting times of other events in the ranked order with an ending time of the group sequentially, wherein the ending time of the group is an ending time of the last event reserved in the group, when the starting time of one of other events is later than the ending time of the group, reserving the one of other events in the group, and when the starting time of one of other events is earlier than the ending time of the first group, adding the one of other events into a next group.

In embodiments, displaying the events based on the grouping and colors of the events includes displaying events included in the same group on one row, and displaying the same type of events with one color.

In a second aspect, an event display device is provided according to an embodiment of the disclosure, which includes an acquiring module, configured to acquire types of events, a setting module, configured to set colors for the events based on the types of the events; a grouping module, configured to group the events based on starting times and ending times of the respective events, and a displaying module, configured to display the events based on the grouping and colors of the events.

In combination with the second aspect, in a first implementation of the second aspect of the disclosure, the grouping module includes: a first ranking sub-module, configured to rank events to be grouped, in a chronological order based on the starting times of the events, to obtain a ranked order, a first adding sub-module, configured to add the first event of the ranked order into a first group, a first comparing sub-module, configured to compare times of other events in the ranked order with an ending time of the first group sequentially, wherein the ending time of the first group is an ending time of the last event added into the first group; and a first grouping sub-module, configured to, in a case that the starting time of one of other events in the ranked order is later than the ending time of the first group, add the one of other events into the first group, and in a case that the starting time of one of other events in the ranked order is earlier than the ending time of the first group, add the one of other events into a second group.

In combination with the second aspect, in a second implementation of the second aspect of the disclosure, the grouping module includes: a type-based grouping sub-module, configured to add events of the same type into a group, and a time-based grouping sub-module, configured to further group the events of the group based on starting times and ending times of the respective events of the group.

In combination with the second implementation of the second aspect, in a third implementation of the second aspect of the disclosure, the time-based grouping sub-module includes a second ranking sub-module, configured to rank the events of the group in a chronological order based on starting times of the events of the group, to obtain a ranked order, a second reserving sub-module, configured to reserve the first event of the ranked order in the group, a second comparing sub-module, configured to compare starting times of other events in the ranked order with an ending time of the group sequentially, wherein the ending time of the group is an ending time of the last event reserved in the group, and a second grouping sub-module, configured to, in a case that the starting time of one of other events is later than the ending time of the group, reserve the one of other events in the group, and in a case that the starting time of one of other events is earlier than the ending time of the first group, add the one of other events into a next group.

In embodiments, the displaying module is configured to display events included in the same group on one row, and display the same type of events with one color.

In embodiments, an event display device is provided according to an embodiment of the disclosure. Functions of the device may be achieved by hardware, or may be achieved by the hardware executing corresponding software. The hardware or software includes one or more modules corresponding to the above functions.

In a possible design, the event display device includes a processor and a memory. The memory is configured to store programs which support the event display device in performing the above event display method, and the processor is configured to execute the programs stored in the memory. The event display device may further include a communication interface which enables the event display device to communicate with another device or communication network.

In a fourth aspect, a computer readable storage medium is provided according to an embodiment of the present disclosure, which is configured to store computer software instructions used by the event display device. The computer software instructions include programs involved in performing the above event display method.

One of the above-described technical solutions has the following advantages or advantageous effects: the event type, event distribution and event duration can be intuitively displayed according to the embodiments of the disclosure.

The other of the above-described technical solutions has the following advantages or advantageous effects: according to the embodiments of the disclosure, the user can quickly screen out valid events and quickly acquire valid information of the events, thereby quickly positioning a fault and determining a cause for the fault.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Subject matter hereof may be more completely understood in consideration of the following detailed description of various embodiments in connection with the accompanying figures.

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

Figure 1:
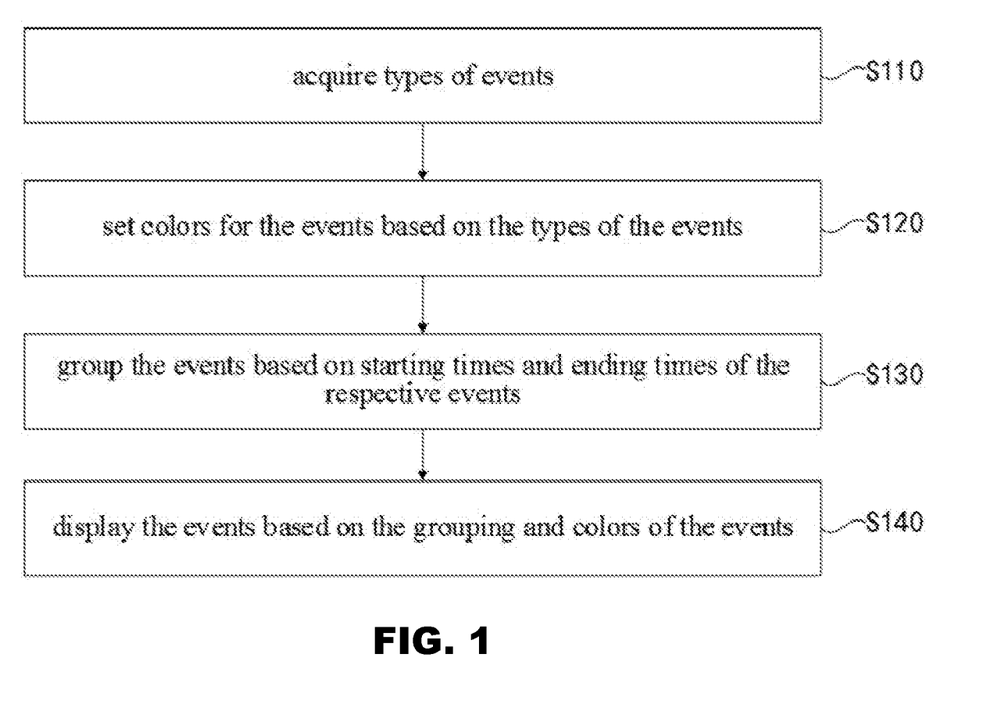
FIG. 1 is a flowchart depicting an event display method according to an embodiment of the present disclosure.

FIG. 1 is a flowchart depicting an event display method according to an embodiment of the present disclosure. The method can include acquiring types of events at S110. The types of events can be acquired by acquiring data representing a plurality of events, each event having a starting time and an ending time.

At S120 colors for the events based on the types of the events can be set. At S130 the events can be grouped based on starting times and ending times of the respective events. In embodiments, events can be grouped by assigning a group identifier to each event, or by storing the identifier of the event in a data structure representing a group. At S140, the events can be displayed based on the grouping and colors of the events.

Figure 2:
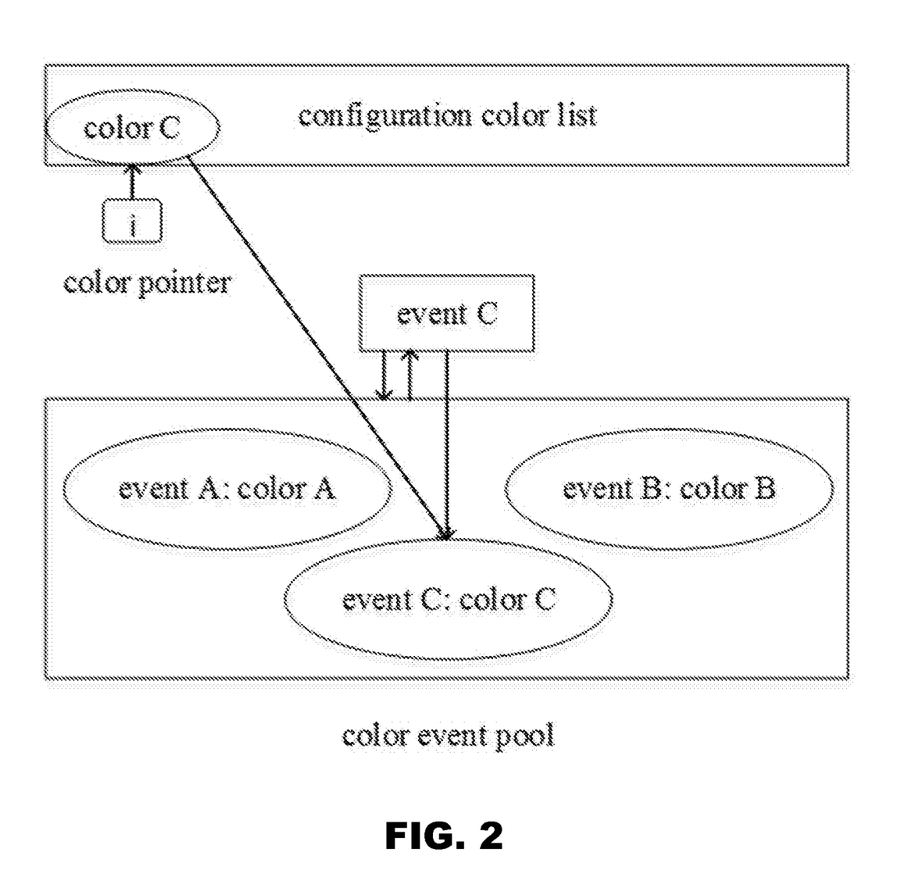
FIG. 2 is a schematic diagram depicting an event display method according to an embodiment of the present disclosure.

In the present embodiment, there may be various types of events according to different application scenes, for example events occurring in scenes such as a machine room, a factory building, a workshop, an operation and maintenance scene, an activity monitoring scene, or the like. A corresponding color is set for each of the events based on the types of the events. Color configurations can be provided in a color event pool. For example, as shown in FIG. 2, color A is assigned for event type A, and color B is assigned for event type B via a color pointer. Therefore, in subsequent event monitoring, a corresponding color can be found in the color event pool based on the event type. Events of different types can be displayed using different colors, so that the events can be found intuitively and quickly based on the colors.

Each event has a starting time and ending time. The events can be grouped based on starting times and ending times of the respective events. This enables event type, event distribution, event duration and the like to be intuitively displayed in time-based spatial dimensions according to the grouping and colors of the events.

Figure 3:
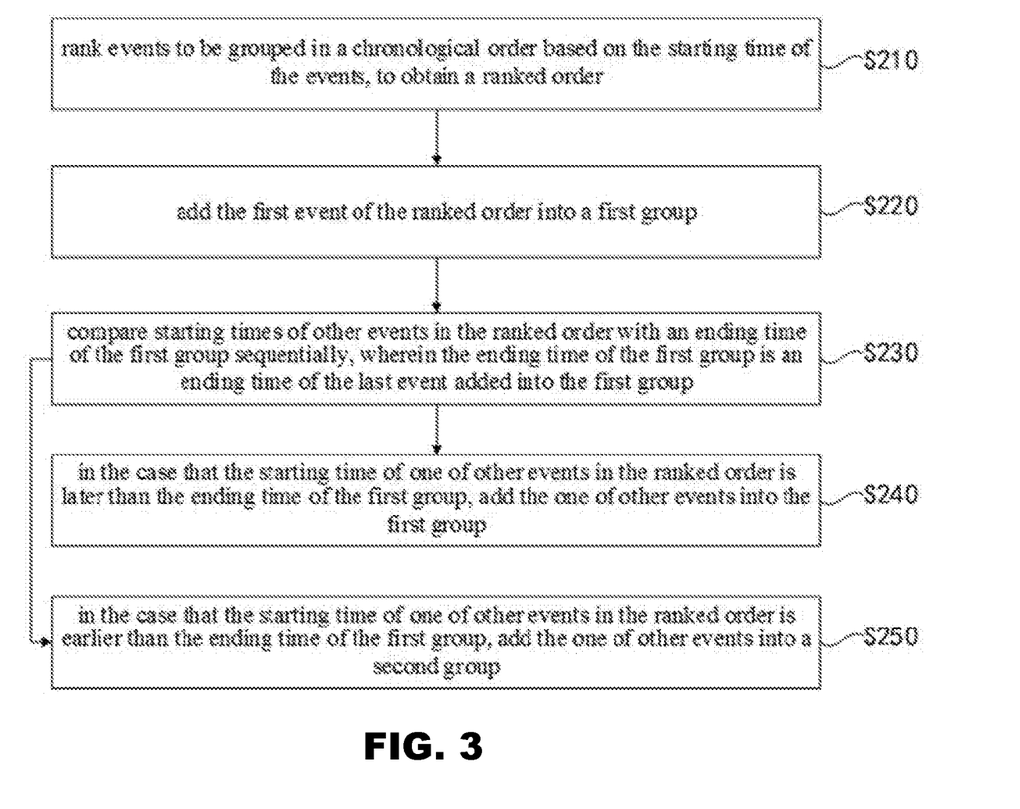
FIG. 3 is a flowchart depicting an event display method according to an embodiment of the present disclosure.

FIG. 3 is a flowchart depicting an event display method according to an embodiment of the present disclosure. As shown in FIG. 3, the embodiment differs from the above embodiment in that the grouping is performed mainly based on starting times and ending times of the respective events.

The method can include, at S210, ranking events to be grouped in a chronological order based on the starting times of the events, to obtain a ranked order. At S220, the first event of the ranked order can be added into a first group. At S230, the starting times of each of the other events in the ranked order with an ending time of the first group can be compared sequentially. The ending time of the first group is an ending time of the last event added into the first group. The last event added into the first group can be the event most recently added into the first group, or preferably, the event with the latest ending time of all of the events in the first group.

If, at S240, the starting time the other event in the ranked order is later than the ending time of the first group, the other event can be added into the first group. If, at S250, the starting time the other event in the ranked order is earlier than the ending time of the first group, the other event can be added into a second (or additional) group).

In the present embodiment, all the events to be grouped may be ranked in a chronological order first based on starting times of the events.

By way of example, consider a series of events where: event 1 starts from 10:05 and ends at 10:10, event 2 starts from 10:00 and ends at 10:15, and event 3 starts from 10:20 and ends at 10:40. Then, a chronological ranking result based on the starting time would be {event 2, event 1, event 3}.

Then, the first ranked event can be directly added into a group which may be a first group. An ending time of the last event added into each group may be taken as an ending time of the group. Again, in the above example, the event 2 is added into the first group. In this case, the ending time of the first group is the ending time of the event 2, i.e., 10:15.

Next, for events to be grouped other than the one ranking the first, the starting times of the events can be sequentially compared with the ending time of the first group. If the starting time of an event to be grouped is later than the ending time of the first group, this can indicate that there is no conflict between the event to be grouped and the first group, and thus the event to be grouped may be added into the first group. If the starting time of the event to be grouped is earlier than the ending time of the first group, it indicates that there is a conflict between the event to be grouped and the first group, and thus the event to be grouped may be added into another group.

Again, in the above example, the starting time 10:05 of event 1 is earlier than the ending time, 10:15, of the last event added into the first group, i.e., event 2, which indicates that there is a conflict between the event 1 and the first group, therefore the event 1 is added into a second group. Continuing on, the starting time 10:20 of event 3 is later than the ending time 10:15 of event 2 in the first group, which indicates that there is no conflict between event 3 and the first group, so event 3 is added into the first group.

For each event to be grouped which that is identified to be added into the second group, the starting time of each also sequentially compared with an ending time of the second group before they are added into the second group. If the starting time of the event to be grouped is later than the ending time of the second group, the event to be grouped is added into the second group. If the starting time of the event to be grouped is earlier than the ending time of the second group, the event to be grouped is added into a third group.

Again, in the above example, if event 4 starts from 10:30 and ends at 11:00 and the event 5 starts from 10:35 and ends at 11:20, a chronological ranking result of all the events is {event 2, event 1, event 3, event 4, event 5}. In addition, the first group includes event 2 and event 3, and the second group includes event 1. In this case, an ending time of the last event added into the first group, i.e., event 3, is 10:40, and an ending time of the last event added into the second group, i.e., event 1, is 10:15. The starting time 10:30 of event 4 to be grouped is earlier than the ending time of the first group, so event 4 is not added into the first group. The starting time 10:30 of the event 4 is later than the ending time of the second group, so the event 4 may be added into the second group.

In this case, the second group includes event 1 and event 4, and the ending time of the second group becomes 11:00. The starting time 10:35 of event 5 to be grouped is earlier than the ending time of the first group, so event 5 is not added into the first group. The starting time 10:35 of event 5 is also earlier than the ending time of the second group, so event 5 is not added into the second group. Therefore, event 5 may be added into another group, i.e., a third group. By analogy, all the events to be grouped are grouped. As a result, each group is populated with events that do not overlap in time. This can enable, for example, display of all of the events within a single group on a common timeline, such as a row or column of a grid.

According to the embodiment, the event type, event distribution and event duration can be intuitively displayed, which is helpful for the user to quickly screen out valid events and quickly acquire valid information of the events.

Figure 4:
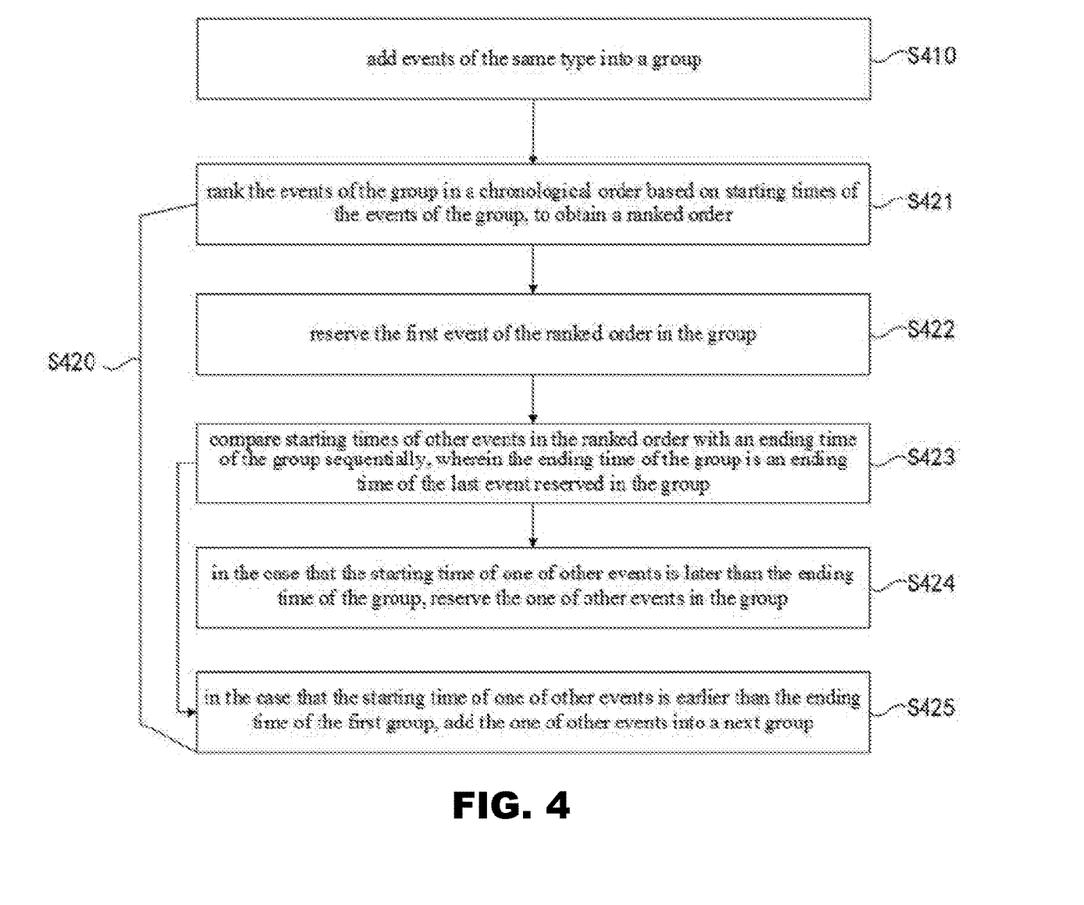
FIG. 4 is a flowchart depicting an event display method according to an embodiment of the present disclosure.

FIG. 4 is a flowchart of an event display method according to an embodiment of the present disclosure. As shown in FIG. 4, the embodiment differs from the above embodiment in that the grouping is performed based on event types, starting times and ending times of the respective events.

In the present embodiment, the events are grouped based on starting times and ending times of the respective events. The method may include at S410, adding events of the same type into a group, and at S420, further grouping the events of the group based on starting times and ending times of the respective events of the group.

In a possible implementation, as shown in FIG. 4, step S420 can include at S421, ranking the events of the group in a chronological order based on starting times of the events of the group, to obtain a ranked order; at S422, reserving the first event of the ranked order in the group, at S423; comparing starting times of other events in the ranked order with an ending time of the group sequentially, wherein the ending time of the group is an ending time of the last event reserved in the group; at S424, in the case that the starting time of one of other events is later than the ending time of the group, reserving the one of other events in the group; and at S425, in the case that the starting time of one of other events is earlier than the ending time of the first group, adding the one of other events into a next group.

For the principle of re-grouping the events to be grouped in a certain group described in S421 through S425 in the embodiment, reference may be made to the relevant principle of grouping all the events to be grouped described above, and a repeated description is not given herein.

Figure 6:
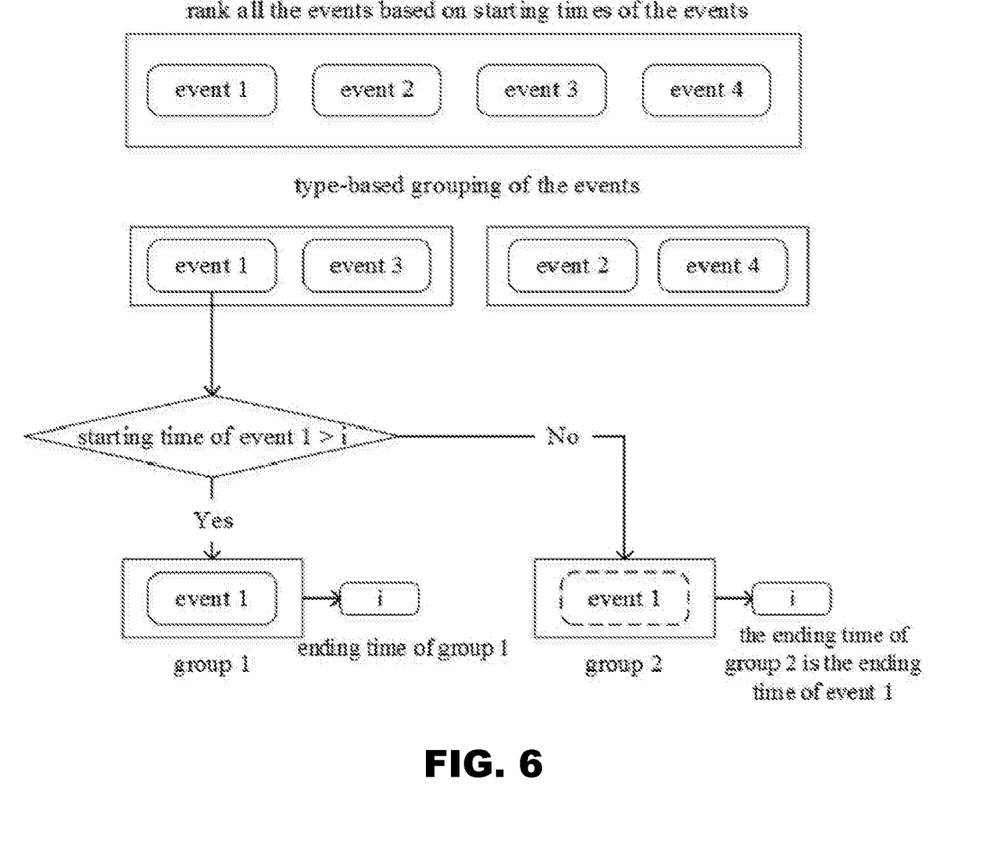
FIG. 6 is a schematic diagram depicting an event display method according to an embodiment of the present disclosure.

The embodiment differs from the above implementation in that events of the same type are added into the same group, and then the events to be grouped are grouped. That is, after the events are grouped based on the types of the events, events of the same type are displayed in the same group, as shown in FIG. 6.

According to the present embodiment of the disclosure, the event type, event distribution and event duration can be intuitively displayed, which is helpful for the user to quickly screen out valid events, quickly acquire valid information of the events, quickly position a fault, and determine a cause for the fault.

In a possible implementation, the displaying the events based on the grouping and colors of the events includes displaying events included in the same group on one row, and displaying the same type of events with one color.

The event type, the event distribution and the duration are intuitively displayed for time-based spatial dimensions based on the grouping and colors of the events.

In an example, all the events are set in correspondence with colors in a color queue by using Data-Driven Document (D3, a program design model in which a drawing flow is determined according to data) in combination with Scalable Vector Graphics (SVG). Then, ranking is performed in a chronological order based on time. Finally, events of the same type are re-grouped based on starting times and ending times of the respective events.

As shown in FIG. 2, corresponding colors may be set for different types of events in the color event pool.

Figure 5:
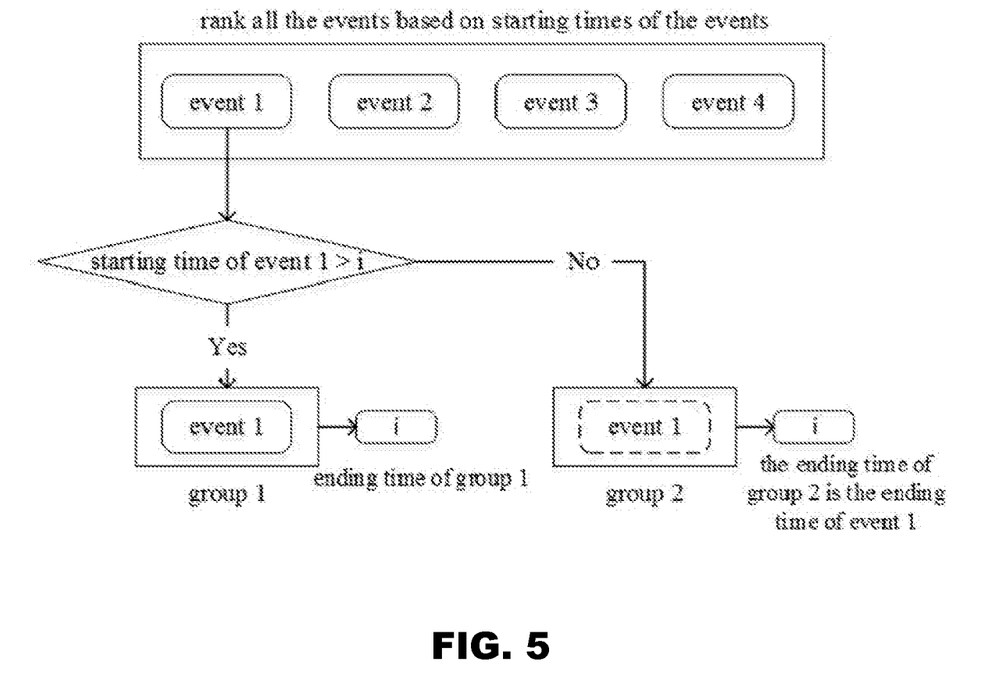
FIG. 5 is a schematic diagram depicting an event display method according to an embodiment of the present disclosure.

As shown in FIG. 3 and FIG. 5, all the events are grouped and ranked based on time, and the events are displayed based on colors and grouping result. For example, if events in the same group are displayed on one row, multiple types (multiple colors) of events may displayed on one row. All the events are ranked based on starting times of the events. For example, a ranking result is {event 1, event 2, event 3, event 4}. It is determined by comparison whether a staring time of each of the events is greater than (later than) the ending time of the group 1. If the comparison result is positive ("yes"), the event is added into a group 1. Otherwise, the event is added into a group 2. The ending time of each group is the ending time of the last event added into the group.

As shown in FIG. 4 and FIG. 6, all the events are firstly grouped based on the types of the events, and then re-grouped based on time. In this way, events of the same type are displayed together, and the events of the same type (the same color) are displayed on the same row. All the events are firstly grouped based on the types of the events to obtain {event 1, event 3} and {event 2, event 4}. For events of the same type in each group, the events are ranked based on starting times of the events. For example, a ranking result is {event 1, event 3} and {event 2, event 4}. For respective events {event 1, event 3} in a group, it is determined by comparison whether a starting time of each event is greater than (later than) the ending time of the group 1. If the comparison result is positive ("yes"), the event is added into the group 1. Otherwise, the event is added into the group 2. An ending time of each group is an ending time of the last event added into the group. Similar grouping is performed for respective events {event 2, event 4} in another group.

In summary, the grouping all the events based on time or the grouping events of the same type base on time may include:

(1) ranking events to be grouped (all the events, or events of the same type) in a chronological order based on starting times of the events;

(2) comparing an ending time of a previous event with a starting time of the current event to determine whether there is a conflict between the previous event and the current event; and (3) if there is a conflict, comparing the starting time of the current event with an ending time of the last event in a next row, where if the previous event is displayed on row lineNum, the next row is row lineNum+1; if there is no conflict between the current event and the last event in the next row, displaying the current event on the next row, i.e., row lineNum+1; if there is a conflict, comparing the starting time of the current event with ending time of the last event in the row lineNum+2, and so on.

Figure 7:
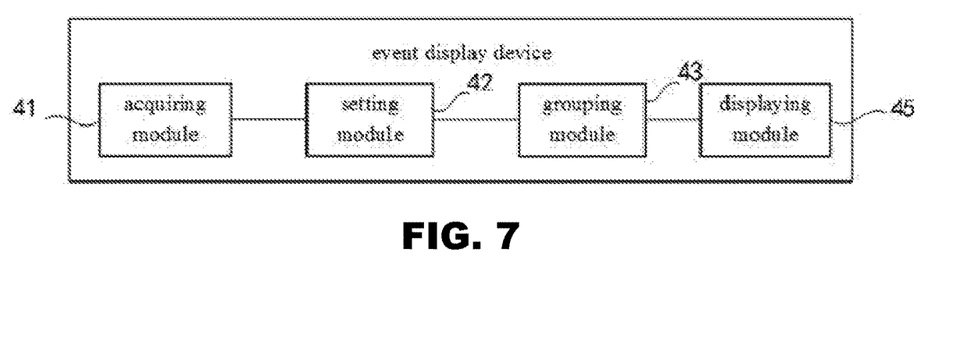
FIG. 7 is a block diagram depicting an event display device according to an embodiment of the present disclosure.

FIG. 7 is a block diagram of an event display device according to an embodiment of the present disclosure. As shown in FIG. 7, the device may include an acquiring module 41, configured to acquire types of events; a setting module 42, configured to set colors for the events based on the types of the events; a grouping module 43, configured to group the events based on starting times and ending times of the respective events; and a display module 45, configured to display the events based on the grouping and colors of the events.

Figure 8:
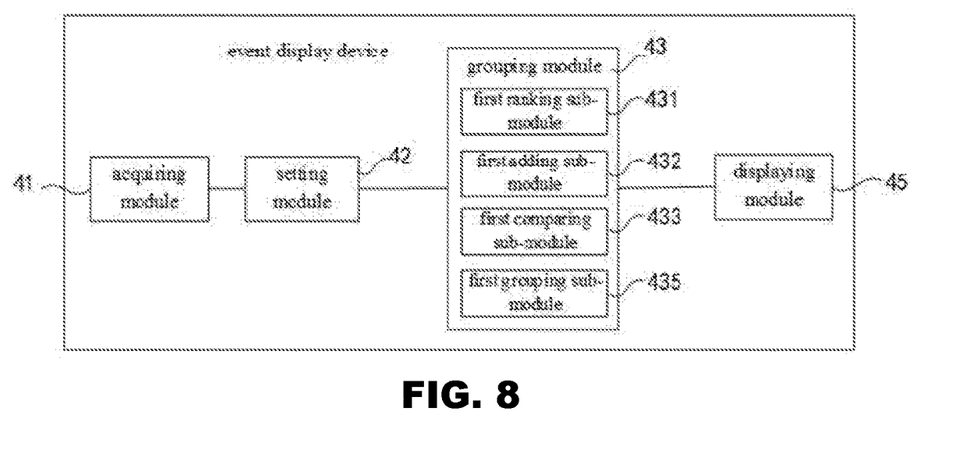
FIG. 8 is a block diagram depicting an event display device according to an embodiment of the present disclosure.

FIG. 8 is a block diagram of an event display device according to an embodiment of the disclosure. As shown in FIG. 8, in a possible implementation, the grouping module 43 includes a first ranking sub-module 431, configured to rank events to be grouped, in a chronological order based on the starting times of the events, to obtain a ranked order; a first adding sub-module 432, configured to add the first event of the ranked order into a first group; a first comparing sub-module 433, configured to compare starting times of other events in the ranked order with an ending time of the first group sequentially, wherein the ending time of the first group is an ending time of the last event added into the first group; a first grouping sub-module 435, configured to, in the case that the starting time of one of other events in the ranked order is later than the ending time of the first group, add the one of other events into the first group, and in the case that the starting time of one of other events in the ranked order is earlier than the ending time of the first group, add the one of other events into a second group.

Figure 9:
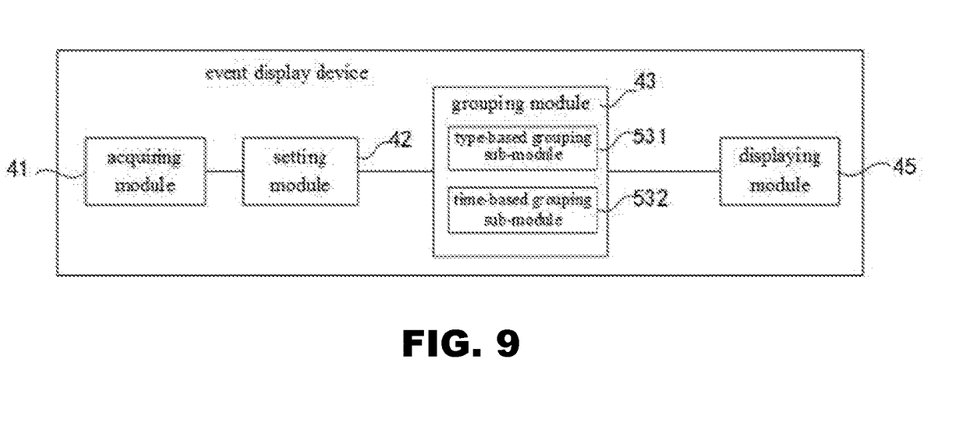
FIG. 9 is a block diagram depicting an event display device according to an embodiment of the present disclosure.

FIG. 9 is a block diagram of an event display device according to an embodiment of the present disclosure. As shown in FIG. 9, the grouping module 43 includes a type-based grouping sub-module 531, configured to add events of the same type into a group; and a time-based grouping sub-module 532, configured to further group the events of the group based on starting times and ending times of the respective events of the group.

In a possible implementation, the time-based grouping sub-module 532 further includes: a second ranking sub-module, configured to rank the events of the group in a chronological order based on starting times of the events of the group, to obtain a ranked order; a second reserving sub-module, configured to reserve the first event of the ranked order in the group; a second comparing sub-module, configured to compare starting times of other events in the ranked order with an ending time of the group sequentially, wherein the ending time of the group is an ending time of the last event reserved in the group; and a second grouping sub-module, configured to, in the case that the starting time of one of other events is later than the ending time of the group, reserve the one of other events in the group, and in the case that the starting time of one of other events is earlier than the ending time of the first group, add the one of other events into a next group. In a possible implementation, the display module 45 is configured to display events included in the same group on one row, and display the same type of events with one color.

For functions of the modules in the device according to the embodiments of the present disclosure, reference may be made to corresponding description of the above methods, and a repeated description is not given herein.

Figure 10:
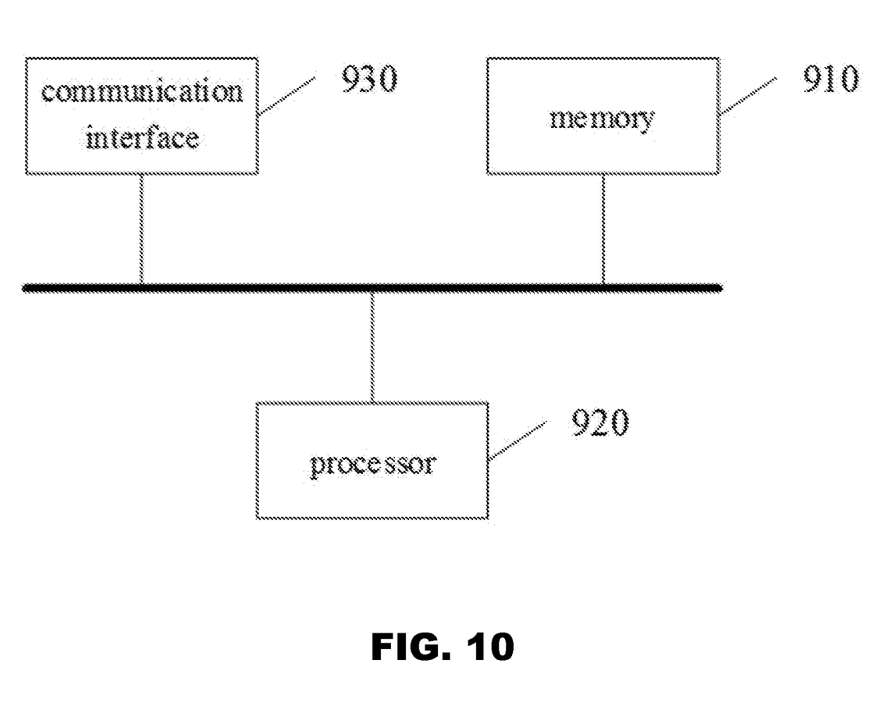
FIG. 10 is a structural block diagram depicting an event display device according to an embodiment of the present disclosure.

FIG. 10 is a structural block diagram of an event display device according to an embodiment of the present disclosure. As shown in FIG. 10, the device includes a memory 910 and a processor 920. A computer program that can run on the processor 920 is stored in the memory 910. When the processor 920 executes the computer program, the event display methods in the above embodiments are implemented. The number of the memory 910 and the processor 920 may each be one or more.

In embodiments, the device further includes a communication interface 930, which is configured to communicate with an external device to realize data interaction and transmission. The memory 910 may include a high-speed RAM memory, or may also include a non-volatile memory, such as at least one disk memory. If the memory 910, the processor 920 and the communication interface 930 are implemented independently, the memory 910, the processor 920 and the communication interface 930 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 10 to represent the bus, but it does not mean that there is only one bus or only one type of bus.

Optionally, in a specific implementation, if the memory 910, the processor 920 and the communication interface 930 are integrated on one chip, then the memory 910, the processor 920 and the communication interface 930 can complete mutual communication through an internal interface.

In an embodiment, the present disclosure provides a computer readable storage medium having a computer program stored thereon that, when executed by a processor, implements any of the methods according to the above embodiments.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "the computer-readable medium" can be any means that can contain, store, communicate, propagate or transmit programs for use by an instruction execution system, apparatus or device or for use in conjunction with the instruction execution system, apparatus or device. More specific examples (non-exhaustive list) of the computer-readable storage medium include: electrical connection parts (electronic devices) having one or more wires, portable computer disk cartridges (magnetic devices), random access memory (RAM), read-only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented by hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more of embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing a particular logical function or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. An event display method, comprising:
   acquiring data representing a plurality of events, each event having a type, a starting time and an ending time;
   setting colors for the events based on the types of the events;
   grouping the events based on the starting times and the ending times of the respective events;
   displaying the events based on the grouping and colors of the events;
   wherein the grouping the events based on starting times and ending times of the respective events comprises:
      ranking the plurality of events in a chronological order based on the starting time of each event, to obtain a ranked order of events;
      adding a first event of the ranked order of events into a first group; and
      for each additional event of the ranked order of events, sequentially comparing the starting time of the additional event with an ending time of the first group, wherein the ending time of the first group is the ending time of a last event added into the first group, and
         when the starting time of the additional event is later than the ending time of the first group, adding the additional event into the first group, and
      when the starting time of one of other events in the ranked order is earlier than the ending time of the first group, adding the additional event into a second group.

2. The event display method according to claim 1, wherein the grouping the events based on starting times and ending times of the respective events further comprises:
   adding events of the same type into a group; and
   further grouping the events of each group based on starting times and the ending times of the respective events of the group.

3. The event display method according to claim 2, wherein further grouping the of the group based on starting times and ending times of the respective events of the group comprises:
   ranking the events of the group in a chronological order based on starting time of each of the events of the group, to obtain a ranked order of events;
   reserving the first event of the ranked order in the group;
   for each additional event of the ranked order, sequentially comparing the starting time of the additional event with an ending time of the group, wherein the ending time of the group is an ending time of the last event reserved in the group, and
      when the starting time of one of other events is later than the ending time of the group, reserving the additional in the group; and
      when the starting time of one of other events is earlier than the ending time of the first group, assigning the additional event into a next group.

4. The event display method according to claim 1, wherein displaying the events based on the grouping and colors of the events comprises:
   displaying each event included in the same group on one row; and
   displaying the same type of events with one color.

5. An event display device, comprising:
- an acquiring module, configured to acquire data representing a plurality of events, each event having a type, a starting time and an ending time;
- a setting module, configured to set colors for each event of the plurality of events based on the types of the events;
- a grouping module, configured to group the events based on the starting time and the ending time of each event; and
- a displaying module, configured to display the plurality of events based on the assigned group and the assigned color of each of the events;

wherein the grouping module comprises:
- a first ranking sub-module, configured to rank events to be grouped, in a chronological order based on the starting times of the events, to obtain a ranked order;
- a first adding sub-module, configured to add the first event of the ranked order into a first group;
- a first comparing sub-module, configured to compare starting times of the other events in the ranked order with an ending time of the first group sequentially, wherein the ending time of the first group is the ending time of the last event added into the first group;
- a first grouping sub-module, configured to, in a case that the starting time of one of other events in the ranked order is later than the ending time of the first group, add the one of other events into the first group, and when the starting time of one of the other events in the ranked order is earlier than the ending time of the first group, add the one of the other events into a second group.

6. The event display device according to claim 5, wherein the grouping module further comprises:
- a type-based grouping sub-module, configured to add events of the same type into a group; and
- a time-based grouping sub-module, configured to further group the events of the group based on starting times and ending times of the respective events of the group.

7. The event display device according to claim 6, wherein the time-based grouping sub-module comprises:
- a second ranking sub-module, configured to rank the events of the group in a chronological order based on starting times of the events of the group, to obtain a ranked order;
- a second reserving sub-module, configured to reserve the first event of the ranked order in the group;
- a second comparing sub-module, configured to compare starting times of other events in the ranked order with an ending time of the group sequentially, wherein the ending time of the group is an ending time of the last event reserved in the group;
- a second grouping sub-module, configured to reserve the one of other events in the group when the starting time of one of other events is later than the ending time of the group, and, add the one of other events into a next group when the starting time of one of other events is earlier than the ending time of the first group.

8. The event display device according to claim 5, wherein the displaying module is configured to display events included in the same group on one row, and display the same type of events with one color.

9. An event display device, comprising:
- one or more processors; and
- a memory, which is configured to store one or more programs;
- wherein the one or more programs are executed by the one or more processors, to enable the one or more processors to implement the method according to claim 1.

10. A non-transitory computer-readable storage medium, in which a computer program is stored, wherein the computer program, when executed by a processor, implements the method according to claim 1.

* * * * *